United States Patent [19]
Bishop et al.

[11] Patent Number: 6,051,628
[45] Date of Patent: Apr. 18, 2000

[54] WATER-RESISTANT INK JET INK

[75] Inventors: John F. Bishop; Jin-Shan Wang, both of Rochester, N.Y.

[73] Assignee: Eastman Kodak Company, Rochester, N.Y.

[21] Appl. No.: 09/145,728

[22] Filed: Sep. 2, 1998

[51] Int. Cl.$^7$ .......................... C09D 11/02; C09D 11/10; C08F 220/10; C08F 220/44; C08F 12/16
[52] U.S. Cl. .................. 523/160; 524/815; 525/916; 525/918; 526/328.5; 526/342; 526/293
[58] Field of Search ...................... 523/160, 161; 524/520, 521, 815; 525/916, 918; 526/319, 320, 328.5, 329.6, 342, 311, 293

[56] References Cited

U.S. PATENT DOCUMENTS

| | | | |
|---|---|---|---|
| 3,068,213 | 12/1962 | Rassweiler et al. | 525/375 |
| 3,948,740 | 4/1976 | Phalangas | 522/62 |
| 4,929,655 | 5/1990 | Takeda et al. | 524/458 |
| 5,519,085 | 5/1996 | Ma et al. | 524/503 |
| 5,597,858 | 1/1997 | Ramesh et al. | 524/458 |

FOREIGN PATENT DOCUMENTS 5186725 of 0000 Japan.
9165541 of 0000 Japan.

*Primary Examiner*—Vasu Jagannathan
*Assistant Examiner*—Callie E. Shosho
*Attorney, Agent, or Firm*—Harold E. Cole

[57] ABSTRACT

A water-resistant ink jet ink composition comprising from about 0.5% to about 5% by weight of a pigment, a carrier, and from about 0.1% to about 2% by weight of a photo-crosslinkable polymeric dispersant having the following formula:

$$(A)_x(B)_y(C)_z$$

wherein:

A represents repeating units of an ethylenically unsaturated group;

B represents repeating units of an ethylenically unsaturated group containing at least one photo-crosslinkable group;

C represents repeating units of an ethylenically unsaturated group which provides water-dispersibility or water-solubility to the dispersant;

x is from 0% to 80 mole %;

y is from 0.1% to 100% mole %; and, z is from 0% to 99.9 mole %.

9 Claims, No Drawings

WATER-RESISTANT INK JET INK

FIELD OF THE INVENTION

This invention relates to an ink jet ink having good water-resistance.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

Water-based ink jet inks are generally made up of a water-soluble dye and/or a pigment dispersed or dissolved in water. Ink jet images printed with these inks have limited image fastness when exposed to humid conditions or water and usually results in significant loss of information which can render the image useless. In order to obtain water-resistance for such images, they usually need to be sprayed with a lacquer material or laminated with another material.

Water-resistant images are required to broaden the applicability of ink jet imaging technology to areas including textile printing, outdoor and indoor display markets, entertainment imaging, etc. However, many ink jet inks on the market are dye-based and use soluble colorants of various dyes. Such ink systems exhibit inherently poor water fastness and poor light stability especially when printed on ordinary bond paper. These dye-based printing systems are limited to the optical density these inks can provide.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Ink jet images prepared with pigmented colorants can offer near-archival light but have poor water fastness due to the water-soluble dispersant used to stabilize the dispersed colorants. Attempts to formulate these inks with addendum that impart water resistance (e.g., polymers, water repellants, etc.) are only marginally successful due to the presence of the water soluble dispersant(s) used to prepare and stabilize the pigment particles.

DESCRIPTION OF RELATED ART

JP 5186725A relates to the use of an ink jet ink comprising water, a water-soluble photocrosslinkable prepolymer, a photopolymerization initiator and a water-soluble dye. However, there is no indication in this reference that pigments may be used instead of dyes or that polymers in the amounts specified herein may be used instead of prepolymers.

JP 9165541A relates to a water-based ink jet recording ink comprising a pigment, an initiator for initiating polymerization or crosslinking and a resin polymerized or crosslinked by the initiator. However, there is no disclosure of the use of a photo-crosslinkable polymeric dispersant in this ink composition.

SUMMARY OF THE INVENTION

A water-resistant ink jet ink composition comprising from about 0.5% to about 5% by weight of a pigment, a carrier, and from about 0.1% to about 2% by weight of a photo-crosslinkable polymeric dispersant having the following formula:

$$(A)x(B)y(C)z$$

wherein:

A represents repeating units of an ethylenically unsaturated group, such as styrene and styrene derivatives, an alkyl acrylate or methacrylate, vinyl acetate, vinyl chloride, acrylonitrile, olefins, or fluorine-containing olefins, B represents repeating units of an ethylenically unsaturated group containing at least one photo-crosslinkable group, such as glycidyl acrylate or methacrylate, or

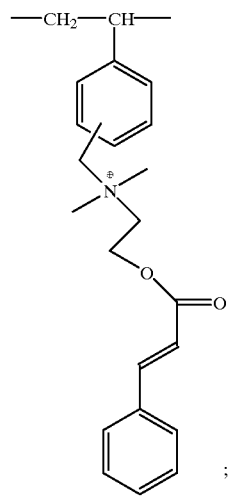

C represents repeating units of an ethylenically unsaturated group which provides water-dispersibility or water-solubility to the dispersant, such as vinyl alcohol, vinyl amine, acrylamide, dimethylaminoalkylacrylate or quaternized dimethylaminoalkylacrylate, dimethylaminoalkylmethacrylate or quaternized dimethylaminoalkylmethacrylate, acrylic or methacrylic acid and their salts, vinyl sulfonic acid and its salts, vinyl phenol, styrene sulfonic acid and its salts, polyethylene glycol acrylate or methacrylate, polyethylene glycol styrene, vinyl pyrolidinone, dimethylaminopropynol or dimethylaminoethanol quaternized chloro-methyl styrene;

x is from 0% to 80 mole %;

y is from 0.1% to 100% mole %; and, z is from 0% to 99.9 mole %.

The above pigmented inks are stable, can be ink jet printed on a wide range of substrates, and can be rendered water-fast by simply irradiating the pigmented image with suitable energy, such as UV-light, which cross-links the polymer to provide the water-resistance.

This invention allows the ink formulator to prepare pigmented ink jet inks that impart excellent light fastness and water resistance even when printed on inexpensive paper stocks. This technology can also be used to produce highly water-resistant images on textiles and other ink receptive substrates.

DETAILED DESCRIPTION OF THE INVENTION

Following is a list of suitable dispersants which can be used in accordance with the invention:

| | (A)x(B)y(C)z | | | | | |
|---|---|---|---|---|---|---|
| Dispersant | A | x | B | y | C | z |
| 1 | — | — | 1* | 0.6 | 2* | 0.4 |
| 2 | — | — | 1* | 0.5 | 2* | 0.5 |
| 3 | $CH_2CHCOOC_4H_9$ | 0.1 | 1* | 0.5 | 2* | 0.4 |
| 4 | — | — | 3* | 0.2 | 2* | 0.8 |
| 5 | $CH_2CHC_6H_5$ | 0.2 | 4* | 0.1 | 5* | 0.7 |
| 6 | $CH_2CHOCOCH_3$ | 0.2 | 3* | 0.1 | 5* | 0.7 |
| 7 | $CH_2CHOCOCH_3$ | 0.1 | 3* | 0.3 | 5* | 0.6 |
| 8 | $CH_2CHCN$ | 0.1 | 1* | 0.5 | 5* | 0.4 |
| 9 | — | — | 1* | 0.6 | 5* | 0.4 |
| 10 | — | — | 1* | 0.4 | 5* | 0.6 |

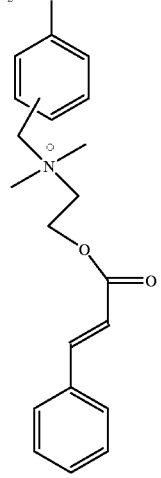

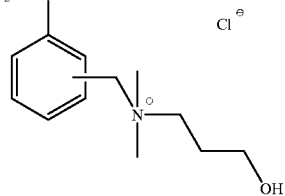

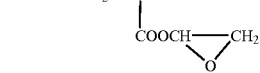

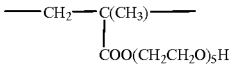

In a preferred embodiment of the invention, B is a cationic vinyl polymer having the following repeating units:

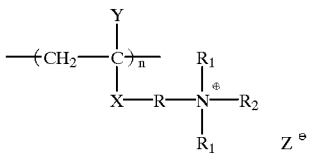

wherein

X is $C_6H_6$, CO, COO or CONH;

Y is H or $CH_3$;

R is a hydrocarbon group;

each $R_1$ independently represents a hydrocarbon group or an oxy-substituted hydrocarbon group containing from 1 to about 16 carbon atoms, provided that at least one $R^1$ contains 1 to 3 carbon atoms;

n is an integer of from about 2 to about 1,000;

$R_2$ is —E—CO—(CH=CH)$_w$—Ar$_1$, —Ar$_2$—(CH=CH)$_w$—CO—E—R$_3$, or

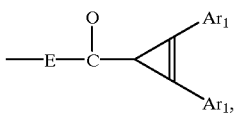

Ar$_1$ is an aromatic moiety;

Ar$_2$ is a divalent aromatic moiety;

E is oxy or imino;

w is 1 or 2;

$R_3$ is a terminal hydrocarbon group; and

Z is a charge balancing counter ion.

In yet another preferred embodiment of the invention, C is a quaternized polymer having the formula:

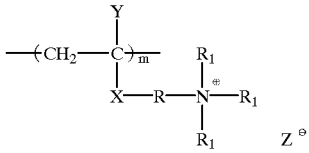

wherein

X, Y, R, $R_1$ and Z are defined as above and m is an integer from about 2 to about 1,000.

In still another preferred embodiment of the invention, C is

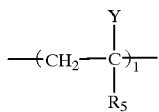

wherein $R_5$ is $COO(CH_2CH_2O)_{p-1}CH_2CH_2OR_6$ wherein p is an integer of from about 1 to about 1,000 and $R_6$ is a terminal hydrocarbon group or H, $COOC_2H_5N(CH_3)_2$, NH2, OH, $C_6H_5OH$, COOM where M is an alkali metal, $C(O)NH_2$, $C(O)NHCH_2CH_2SO_3OH$, $C_6H_5SO_3M$, or

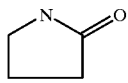

and l is an integer of from about 2 to about 1,000.

As noted above, the photo-crosslinkable polymeric dispersant is crosslinkable with radiation, such as UV radiation. Heating the print for a period of time can produce similar crosslinking results.

In another preferred embodiment of the invention, the photo-polymeric dispersant is a polymer of quaternized chloro-methyl styrene. In still another preferred embodiment, the polymer of quaternized chloro-methyl styrene has the formula:

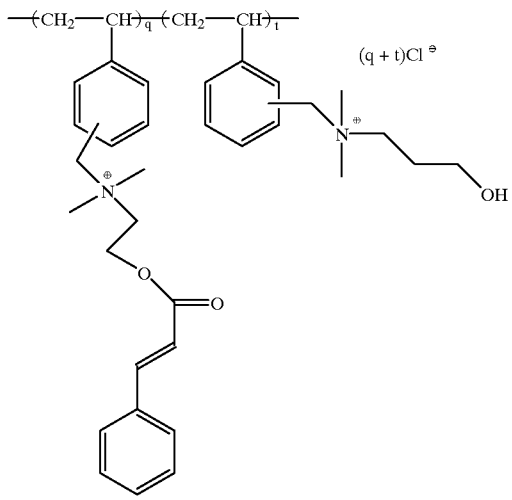

where q and t are each from about 0.1 mole % to about 99.9 mole.

In the present invention, any of the known organic pigments can be used. Pigments can be selected from those disclosed, for example, in U.S. Pat. Nos. 5,026,427; 5,085,698; 5,141,556; 5,160,370 and 5,169,436. The exact choice of pigment will depend upon the specific color reproduction and image stability requirements of the printer and application. For four-color printers combination of cyan, magenta, yellow, and black (CMYK) pigments should be used. An exemplary four color set may be copper phthalocyanine (pigment blue 15), quinacridone magenta (pigment red 122), paliotol Yellow D0960HD (pigment yellow 138) and carbon black (pigment black 7). In a preferred embodiment of the invention, the pigment has a particle size of from about 10 nanometers to about 1000 nanometers.

The carrier employed in the invention can be water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

A preferred method for making the inks of the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have, a pH in the range of 5 to 9, a surface tension in the range of about 20 dynes/cm to about 70 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

Inks according to this invention have a total trace metal contamination concentration of less than 100 parts per million of ink containing 2.5% by weight of pigment.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or cosolvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continues stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

A pigmented ink was prepared from an aqueous slurry of a yellow solid particulate pigment Paliotol® Yellow K-1841 (BASF Corp.) commonly known as pigment #139. The slurry was prepared by adding the following ingredients to a water-jacketed 2 liter vessel:

620 grams polymeric beads, mean diameter of 50 $\mu$m (milling media)

78.2 grams Pigment Yellow #139

145.3 grams solution 16.1% of polymer of quaternized chloro-methyl styrene-(CMSR)

296.3 grams de-ionized water

These ingredients were mixed and blended using a high shear "Cowles" type mixer for 12 hours using a 60 mm "Cowles" blade rotating at a speed of 5740 rev/min. At the end of the 12 hour milling process the following ingredients were added:

222 grams de-ionized water 1.2 grams of biocide (manufactured by Rohm and Haas and known as Kathon LX®)

The mixture was mixed at a slow speed (100 rev/min) and filtered through a 5 $\mu$m filter to separate the polymeric milling media from the liquid slurry.

The ink was prepared by blending the following ingredients on a lab mixer for 15 minutes:

15.9 grams of slurry of Pigment Yellow #139 (analyzed pigment solids=9.23%)

4.6 grams of polymer solution (CMSR) solution @ 16.1% in water)

2.5 grams diethylene glycol 2.5 grams glycerin 0.15 grams photosensitizer and commonly known as 3-(7-methoxy-3-coumarinoy)-1-methylpyridinium-p-toluenesulfonate 24.2 grams de-ionized water The ink was filtered through a 5 $\mu$m filter and loaded in an ink jet cartridge (model 51626A) manufactured by Hewlett-Packard Inc. The ink cartridge was loaded into an ink jet printer (Hewlett-Packard Model 550C) and an image was printed on the following substrates:

1. Bond paper-manufactured by Hammermill Inc. and identified as Tidal® DP
2. Lycra®-like fabric
3. Lycra®-cotton blend fabric The reflection density of the test print was measured. The test prints were subsequently exposed for 50 seconds under an ultraviolet light source with an intensity of 18 milliJoules per square centimeters at 405 nanometers. During the UV exposure, one half of the image area was covered and remained unexposed. The reflection density was measured in the exposed and unexposed areas.

The prints were then tested for water resistance by placing the printed side of the receiver perpendicular to a stream of de-ionized water (flow rate=11.8 liters per minute/water temperature=21° C.) 2 feet below the water source. The washed print was dried and the reflection density was measured again in the exposed and unexposed areas as follows (average of 6 sets of prints):

| Receiver | Density | | | | Density Change | | % Density Change | |
|---|---|---|---|---|---|---|---|---|
| | Unwashed | Washed | Unwashed | Washed, | Washed–Unwashed | | Washed–Unwashed | |
| Substrate | Unexposed | Unexposed | Exposed | Exposed | Unexposed | Exposed | Unexposed | Exposed |
| Bond paper | 1.0 | 0.81 | 1.0 | 1.1 | −0.19 | 0.1 | −19 | 7 |
| Lycra ®-like fabric | 0.83 | 0.53 | 0.86 | 0.95 | −0.30 | 0.09 | −36 | 9 |
| Lycra ®-cotton blend | 0.85 | 0.65 | 0.85 | 0.98 | −0.20 | 0.13 | −23 | 10 |

The above data show that ink jet prints prepared with pigmented inks stabilized with the photo-crosslinkable polymer of the invention produce images with enhanced water resistance on various substrates. The prints irradiated and crosslinked with UV light exhibit superior water resistance while the "unexposed" prints lost significant image density by post-treatment with water. The slight density gain observed with the prints obtained using the invention is attributable to "dot gain" resulting from the spreading of the printed dots that comprise the image area.

The invention has been described in detail with particular reference to certain preferred embodiments thereof, but it will be understood that variations and modifications can be effected within the spirit and scope of the invention.

What is claimed is:

1. A water-resistant ink jet ink composition comprising from about 0.5% to about 5% by weight of a pigment, a carrier, and from about 0.1% to about 2% by weight of a photo-crosslinkable polymeric dispersant having the following formula:

(A)x(B)y(C)z wherein:
A represents repeating units of an ethylenically unsaturated group wherein A is selected from the group consisting of styrene derivatives, an alkyl acrylate or methacrylate, vinyl acetate, vinyl chloride, acrylonitrile, olefins, or flourine-containing olefins;
B represents repeating units of an ethylenically unsaturated group containing at least one photo-crosslinkable group;
C represents repeating units of an ethylenically unsaturated group which provides water-dispersibility or water-solubility to the dispersant;
x is from 0% to 80 mole %;
y is from 0.1% to 100% mole %; and,
z is from 0% to 99.9 mole %.

2. The composition of claim 1 wherein B is a cationic vinyl polymer having the following repeating units:

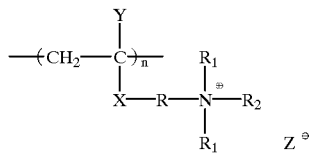

wherein
X is $C_6H_6$, CO, COO or CONH;
Y is H or $CH_3$;
R is a hydrocarbon group;
each $R_1$ independently represents a hydrocarbon group or an oxy-substituted hydrocarbon group containing from 1 to about 16 carbon atoms, provided that at least one $R^1$ contains 1 to 3 carbon atoms;
n is an integer of from about 2 to about 1,000;

$R_2$ is —E—CO—(CH=CH)$_w$—Ar$_1$, —Ar$_2$—(CH=CH)$_w$—CO—E—R$_3$, or

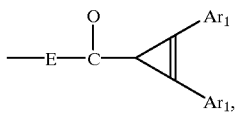

Ar$_1$ is an aromatic moiety;
Ar$_2$ is a divalent aromatic moiety;
E is oxy or imino;
w is 1 or 2;
$R_3$ is a terminal hydrocarbon group; and
Z is a charge balancing counter ion.

3. The composition of claim 1 wherein C is a quaternized polymer having the formula:

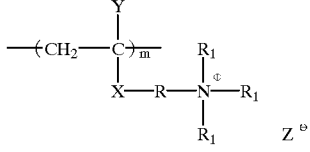

wherein
X, Y, R, $R_1$ and Z are defined as above and m is an integer from about 2 to about 1,000.

4. The composition of claim 1 wherein C is

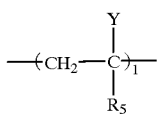

wherein
Y is H or $CH_3$, $R_5$ is COO($CH_2CH_2O$)$_{p-1}CH_2CH_2OR_6$ wherein p is an integer of from about 1 to about 1,000 and $R_6$ is a terminal hydrocarbon group or H, $COOC_2H_5N(CH_3)_2$, $NH2$, OH, $C_6H_5OH$, COOM where M is an alkali metal, $C(O)NH_2$, $C(O)NHCH_2CH_2SO_3OH$, $C_6H_5SO_3M$, or

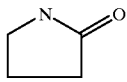

and
l is an integer of from about 2 to about 1,000.

5. The composition of claim 1 wherein said photo-crosslinkable polymeric dispersant is a polymer of quaternized chloro-methyl styrene.

6. The composition of claim 5 wherein said polymer of quaternized chloro-methyl styrene has the formula:

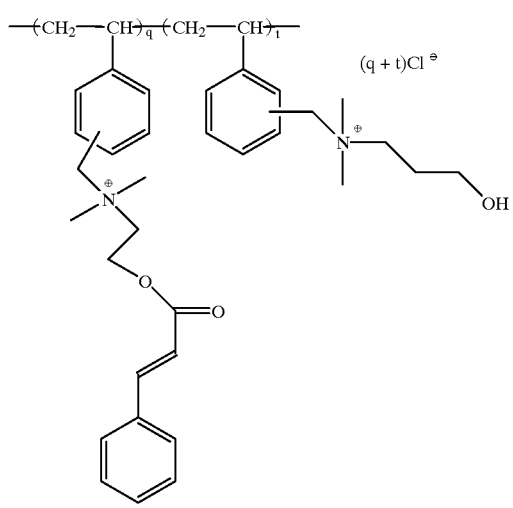
where
q and t are each from about 0.1 mole % to about 99.9 mole.
7. The composition of claim 1 wherein said photo-crosslinkable polymeric dispersant is crosslinkable with UV radiation.
8. The composition of claim 1 wherein said carrier is water.
9. The composition of claim 1 wherein said pigment has a particle size of from about 10 nanometers to about 1000 nanometers.
* * * * *